United States Patent
Goodes et al.

(10) Patent No.: US 12,493,541 B1
(45) Date of Patent: *Dec. 9, 2025

(54) LIGHTWEIGHT CODE INTEGRITY SOLUTION WITH BYTE-PATTERN ENTANGLEMENT IN PROGRAM CODE

(71) Applicant: Zimperium, Inc., Dallas, TX (US)

(72) Inventors: Grant Stewart Goodes, Ottawa (CA); Javier Lopez Gomez, Madrid (ES); Ričards Dzenis, Rīga (LV); Peteris Ledins, Sigulda (LV)

(73) Assignee: Zimperium, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/049,790

(22) Filed: Feb. 10, 2025

Related U.S. Application Data (63) Continuation of application No. 19/042,905, filed on Jan. 31, 2025.

(51) Int. Cl.
*G06F 9/44* (2018.01)
*G06F 9/30* (2018.01)
*G06F 11/3604* (2025.01)

(52) U.S. Cl.
CPC ...... *G06F 11/3612* (2013.01); *G06F 9/30058* (2013.01)

(58) Field of Classification Search
CPC .................. G06F 11/3612; G06F 9/30058
See application file for complete search history.

(56) References Cited

U.S. PATENT DOCUMENTS

| | | | |
|---|---|---|---|
| 2017/0017798 A1* | 1/2017 | Bhat | G06F 21/44 |
| 2018/0052904 A1* | 2/2018 | Fusco | G06F 16/9535 |
| 2021/0342900 A1* | 11/2021 | Memon | G16H 15/00 |

* cited by examiner

*Primary Examiner* — Hang Pan
(74) *Attorney, Agent, or Firm* — Fenwick & West LLP (57) ABSTRACT

A system and a method are disclosed for providing a lightweight code integrity solution. The system identifies one or more target code blocks in program code and determines one or more locations in the program code where an integrity check is to be embedded to verify the integrity of the code block. The system may determine an integer value associated with a byte-pattern of machine-code instructions in the code blocks and generates the integrity check by entangling the integer value into one or more computations of the program code. The system embeds the integrity check at the determined location in the program code.

20 Claims, 4 Drawing Sheets

LIGHTWEIGHT CODE INTEGRITY SOLUTION WITH BYTE-PATTERN ENTANGLEMENT IN PROGRAM CODE

CROSS-REFERENCE TO RELATED APPLICATION

This application is a continuation of U.S. application Ser. No. 19/042,905, filed Jan. 31, 2025, the disclosure of which is herein incorporated by reference in its entirety.

TECHNICAL FIELD

The disclosure generally relates to the field of computing technology, and more particularly relates to code integrity solutions.

BACKGROUND

Code integrity solutions operate to ensure that program code has not been tampered with or altered maliciously. Code integrity solutions may use a cryptographic signature for the final, post-link binary, which represents the fully compiled and linked version of the program. This signature acts as a unique "fingerprint" for the code, enabling the detection of modifications. At runtime, a system recalculates the signature for the executed code and compares it with the original. If the signatures match, the code is verified as untampered; if they differ, this signals potential issues like malware injection or corruption, prompting actions such as terminating the program or alerting administrators. While code integrity solutions provide strong protection against unauthorized modifications and tampering, they also come with several deficiencies and challenges. Code integrity solutions often rely on static signatures, hashes, or hard-coded markers to verify that code has not been tampered with, but their static nature makes them predictable and vulnerable. Attackers can analyze the code to locate these signatures or integrity checks and then modify or bypass them. For instance, attackers may replace the signature with their own, manipulate the verification logic to always return a valid result, or disable the integrity checks altogether, undermining the protection these solutions provide.

Moreover, traditional code integrity solutions face challenges such as performance overhead, ineffective and unnecessary protection, difficulties in targeting protections, overlapping and entangled check ranges, and the like. Overprotection wastes resources on code that is not valuable for security, while the distributed nature of integrity checks can lead to gaps in coverage or unverified dependencies between functions. Additionally, overlapping or entangled integrity-checking logic creates a complex web of dependencies, making it hard to maintain robust protection in dynamic or large-scale systems. These challenges reveal inherent inefficiencies in traditional code integrity solutions. Addressing these issues requires more precise integrity mechanisms that focus on critical regions of code.

SUMMARY

Systems and methods are disclosed herein that, in some embodiments, at build time, read a byte-pattern of a target instruction as an integer value and entangle the integer value with computations at selected check locations. During runtime, the entangled computations are executed at the check locations to determine whether the target instruction has been attacked. The disclosed solution entangles the byte-pattern of a target instruction into dynamic computations at specific, strategically chosen locations in the program. Because the integrity check is integrated into the program's logic, rather than requiring additional resources to compute and verify signatures or hashes at each checkpoint, this solution reduces the computational cost. By performing checks only at selected locations (e.g., where the program's behavior is most susceptible to malicious alterations), the solution prevents unnecessary checks from being performed on code, thus avoiding the overhead and inefficiencies associated with excessive protection. Additionally, by distributing the integrity checks across various locations in the program and incorporating them into existing computational expressions, this solution obfuscates the protection mechanism. The use of dynamic computations further complicates attempts to reverse-engineer or tamper with the program, as the exact relationship between the target instruction and the program's behavior is not easily discernible. In this way, the disclosed code integrity solution herein introduces a more targeted and dynamic approach to protecting target instructions by not only verifying their integrity but also embedding their integrity checks directly into the program's computation. This approach reduces overhead by focusing on selected target instructions and enhances robustness by creating a dependency between the protected instructions and the checking function.

BRIEF DESCRIPTION OF DRAWINGS

The disclosed embodiments have other advantages and features that will be more readily apparent from the detailed description, the appended claims, and the accompanying figures (or drawings). A brief introduction of the figures is below.

Figure (FIG. 1 illustrates one embodiment of a system environment including a computing device with a security system, according to one or more embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment Overview

Figure 1:
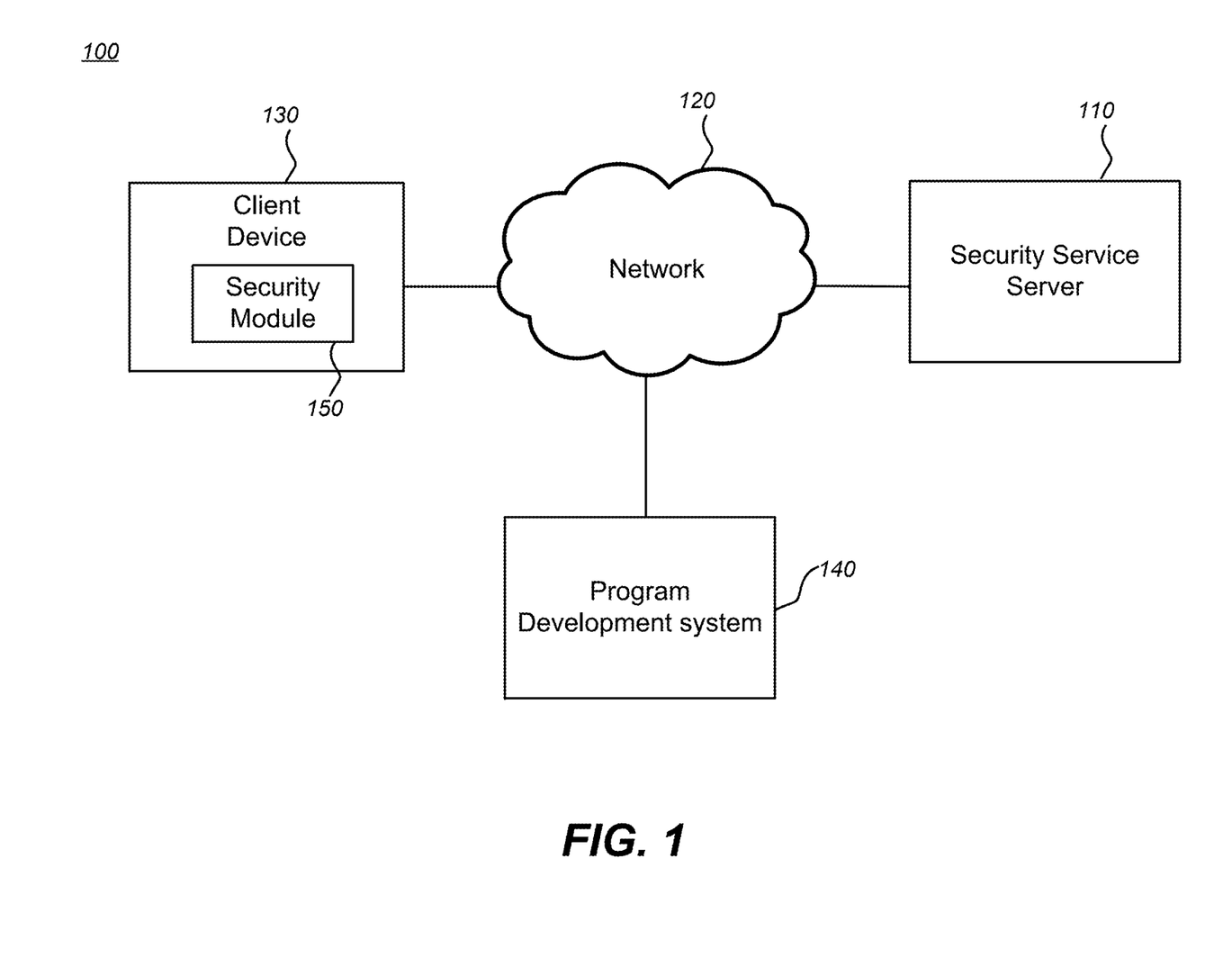

Figure (FIG. 1 illustrates one embodiment of a system environment 100 including a security service server 110, according to one or more embodiments. Environment 100 also includes network 120, a client device 130, and a program development system 140. The system environment 100 may also include different or additional entities.

The security service server 110 is a computer system configured to provide a code integrity solution to program code. In some embodiments, at build time, the security service server 110 may receive a program code from a program development system 140 and generate integrity checks in the program code. During runtime, the program code runs at the client device 130, which causes the integrity checks to be verified to determine whether the program code is altered. The security service server 110 may include a singular computing system, such as a single computer, or a network of computing systems, such as a data center or a distributed computing system. The security service server 110 may be one or more servers (e.g., forming a cloud-based service) that receives data and performs analysis to generate protection actions for an application. In some implementations, the security service server 110 may generate integrity checks and embed the integrity checks within program code at the build time. During runtime of the program code, the integrity checks may be verified to verify the authenticity and correctness of the program code or runtime behavior. In some implementations, once the integrity checks are generated and embedded in the program code, the security service server 110 may transmit the program code to the program development system 140 or directly to client device 130. The security service server 110 may not have access to the client device 130 while the program code runs at the client device 130. Alternatively, the security service server 110 may access the client device 130 via the network 120 and monitor the status of the integrity checks and/or receive verification results of the integrity checks on the program code that runs at the client device 130. In some embodiments, the security service server 110 may be implemented as a module (e.g., a security module 150) that is installed at the client device 130. When the program code runs at the client device 130, the security module may monitor the integrity checks in the program code without accessing the network 120.

The security service server 110 may access the client device 130 and/or the program development system 140 through the network 120. In some embodiments, the network 120 includes any combination of local area and/or wide area networks, using wired and/or wireless communication systems. The network 120 may use standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 120 may be encrypted using any suitable technique or techniques.

The client device 130 includes one or more processors configured to control operation of the client device 130 by performing functions. The client device 130 may be a server, a computing device, an app store, a website, a physical media (e.g., hard drive, disks, etc.), a cloud-based platform, and the like. Examples of such client devices 130 include personal computers (PC), desktop computers, laptop computers, tablets, smartphones, wearable electronic devices such as smartwatches, or any other suitable electronic devices. In various embodiments, a client device 130 includes a memory comprising a non-transitory storage medium on which instructions are encoded. The memory may have instructions encoded thereon that, when executed by the processor, cause the processor to perform functions.

In some embodiments, a client device 130 executes an application allowing a user of the client device 130 to interact with the security service server 110. For example, a client device 130 can execute a browser application to enable interaction between the client device 130 and the security service server 110 via the network 120. In another embodiment, the client device 130 interacts with the security service server 110 through an application programming interface (API) running on a native operating system of the client device 130, such as IOS® or ANDROID™.

The client device 130 may run program code and verify integrity checks embedded in the program code to determine whether the program code has been altered. In some embodiments, the security service server 110 may not access the client device 130 during runtime of the program code; alternatively, the security service server 110 may access the client device 130 to monitor the verification of program code and/or the status of the integrity checks. In some embodiments, the client device 130 may include a security module 150 that is provided by the security service server 110 for monitoring integrity checks in a program code that is running at the client device 130. In some embodiments, the security module 150 may perform some or all of the functions/process described with respect to security service server 110 in FIGS. 2-4.

A program development system 140 is a computing platform that is accessed and operated by a software developer. The program development system 140 may be a server, computer system, or computing device that is used by software developers for writing, testing, and deploying program code. The program development system 140 may be equipped with the hardware and software tools required for software development tasks. In some implementations, the program development system 140 may communicate with the security service server 110 and the client devices 130 via the network 120.

Security System Configuration

Figure 2:
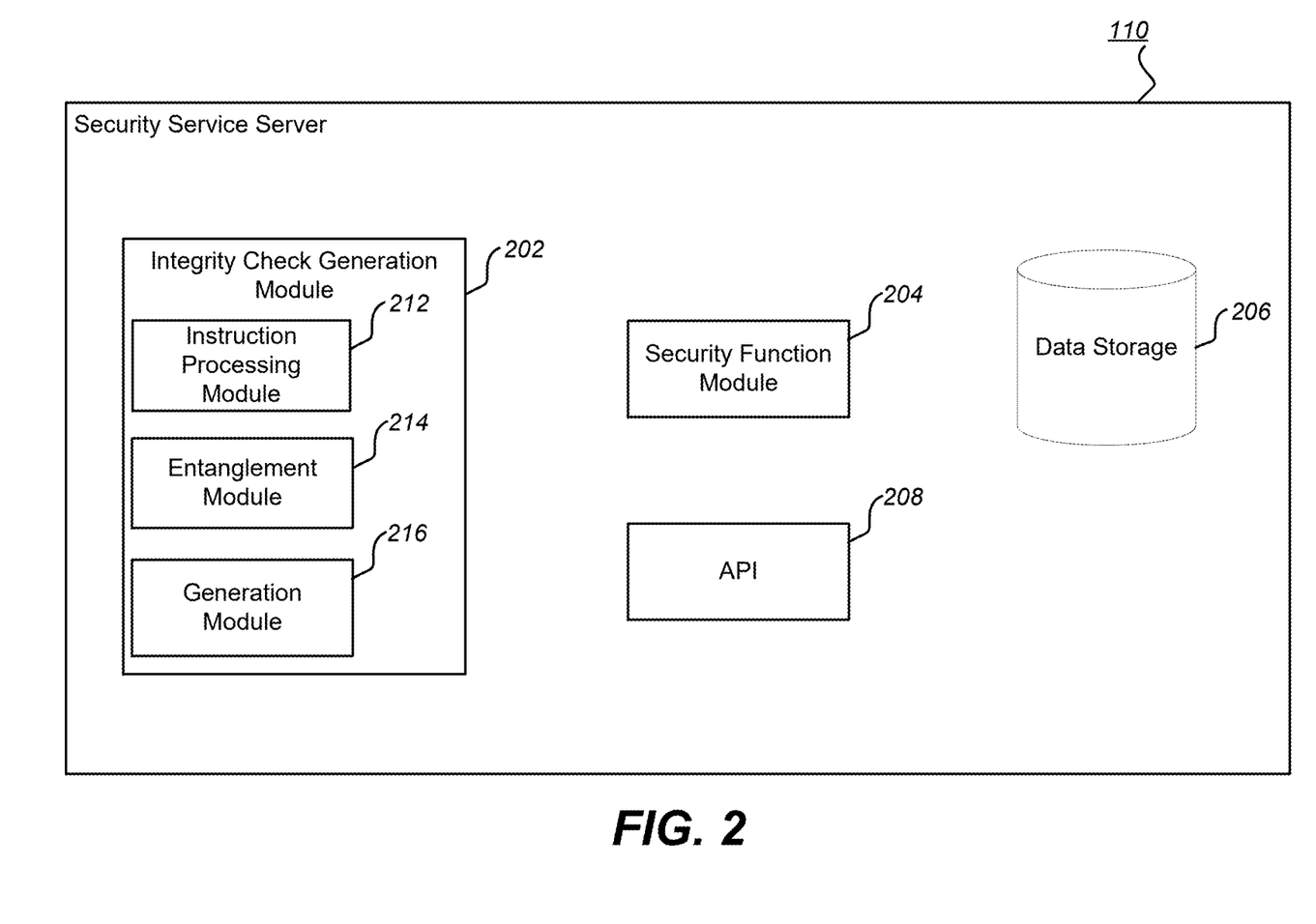
FIG. 2 illustrates one embodiment of exemplary modules of a security system, according to one or more embodiments.

FIG. 2 illustrates exemplary modules of a security system, according to one or more embodiments. The security service server 110 includes an integrity check generation module 202, a security function module 204, a data storage 206, and an application program interface (API) 208. The modules depicted with respect to security service server 110 are exemplary; more or fewer modules and databases may be used, consistent with the disclosure provided herein. For instance, the entanglement module 214 and the generation module 216 may be implemented as one module which generates an integrity check by modifying an existing value or add an instruction to an existing instruction.

The integrity check generation module 202 generates integrity checks during build-time of the program code. The integrity check generation module 202 may receive the program code from a program development system 140. For example, a developer who builds an application using a program development system 140 may provide the program code of the application to the integrity check generation module 202 in the security service server 110 to generate integrity checks to protect the program code. In some embodiments, the integrity check generation module 202 may include an instruction processing module 212, an entanglement module 214, and a generation module 216. The integrity check generation module 202 identifies a code block, which may include one or more target instructions for protection and determines locations in the program code to embed the integrity checks. The entanglement module 214 entangles the encoding (e.g., byte-pattern) of the target instructions to computations in the execution of the program code. The generation module 216 generates the integrity check and embeds the integrity checks into the program code at the build time of the program code.

In some embodiments, the instruction processing module 212 identifies a code block in program code for protection. The code block may include one or more instructions (e.g., target instructions) whose integrity are to be protected. The instruction processing module 212 may identify the target instructions as instructions that are likely to be targeted by attackers. For example, code responsible for authentication, encryption, or managing sensitive data is often a primary target for attackers. Similarly, control flow mechanisms, such as loops and branching statements, are often prime targets for manipulation since they govern the program's logic. Attackers may attempt to inject malicious code, alter control flow logic, or modify function outputs. In some embodiments, the instruction processing module 212 may identify the target instructions as instructions whose integrity affect the overall security and correctness of the program code. The instruction processing module 212 may analyze the program code to determine which functions, loops, and instructions are critical to its operation and security. In some implementations, critical functions may include those that perform key tasks such as verifying user credentials, executing encryption routines, or handling privileged system calls. The identified target instructions may include branch instructions that control program flow (e.g., conditional jumps, calls, or returns), key constants or operations (such as cryptographic keys or security-critical algorithms), function entry points (such as for sensitive functions like authentication or privilege escalation handlers), and the like. For example, a target instruction may be a conditional branch, e.g., the underlying instruction generated for a "if (user_input==42) construct". In another example, a target instruction may be a function call, e.g., access_secure_area( ). By identifying the target instructions, the security service server 110 provides a code integrity solution that avoids the inefficiencies of protecting irrelevant parts of the code, concentrating computational resources where they are needed.

In some implementations, the instruction processing module 212 may identify a target instruction by analyzing the representation of the target instruction in an assembly language or machine code generated by a compiler. The instruction processing module 212 may decode the bytes in the program code to identify the target instruction. In some implementations, the instruction processing module 212 may use a disassembler to translate the binary code into its assembly language equivalent to identify the target instruction. In some implementations, the instruction processing module 212 may use a dynamic analysis tool to execute the program code and observe the instructions' execution to determine a target instruction.

The instruction processing module 212 may determine one or more locations in the program code where the integrity checks are to be embedded. In some embodiments, the integrity checks are to be verified during execution of the program code during runtime. The integrity checks may be embedded within the vicinity of a critical program logic so that the result of verifying the integrity check may have a direct influence on the program's immediate behavior. In some embodiments, the location of an integrity check may at least partially depend on the target instruction's location. For example, a target instruction is a conditional branch function near a decision point of the program logic. The instruction processing module 212 may determine that the location of the integrity check corresponding to this target instruction is also near the same decision point (e.g., at the location where the target instruction is to be executed) so that if the target instruction is tampered with, the integrity check will fail, rendering the program code unusable. The integrity check may be closely coupled with local program behaviors so that any changes to the target instruction will immediately affect the program's functionality, making it difficult for attackers to tamper without being detected. In some embodiments, the instruction processing module 212 may determine to insert the integrity check before a function call, which reduces the opportunity for an attacker to make any code changes in the target function.

The entanglement module 214 reads the byte-pattern of the target instruction. The byte-pattern of an instruction is a machine code representation of the instruction. Each instruction may be represented by a specific sequence of bytes in the binary file or memory (e.g., 0x05 may represent a conditional jump instruction). In one implementation, the entanglement module 214 may retrieve a byte-pattern of a target instruction and convert the byte-pattern to an integer value. For example, a byte-pattern of a target instruction is 0xABCD, the entanglement module 214 may convert the byte-pattern into an integer 43981. For longer instructions with more bytes (e.g., 0xE8 0x12 0x34 0x56 0x78), the entanglement module 214 may convert the byte-pattern to a larger integer.

The entanglement module 214 entangles the byte-pattern into a computation of the program code. An entanglement operation refers to a mechanism or process where multiple components (such as instructions, data, or cryptographic values) are interlinked or intertwined in such a way that tampering with any one part of the system affects the integrity of the entire structure. In some embodiments, the entanglement module 214 may access a library that includes a plurality of entanglement mechanisms. For example, a control flow entanglement ties integrity checks to branching or execution paths, so altering one disrupts the program/s behavior. A data dependency entanglement links data values and instructions, making them interdependent, while instruction-level entanglement encodes relationships between instructions, such as using redundant or self-modifying code. The entanglement module 214 may analyze the type and characteristics of a target instruction and select at least one entanglement mechanism from the library for entangling the target instruction with the computation of the program code. In some implementations, for a maximum security of the entanglement, the actual numeric value of the target instruction may not appear in the entangled expression. For example, if the target instruction TI has value 0xABCD, then an entangled expression expecting to return 0 may not have the value "0xABCD,", e.g., "0xABCD-readInstructionValue(TI)."

In some embodiments, the entanglement module 214 may entangle the integer value corresponding to the byte-pattern into an expression or logic that influences the program's control flow, calculations, or decision-making process. For example, the integer value may be used in calculations that affect the program's control flow, return values, or internal states. In this way, if the target instruction is tampered with, the byte-pattern will change, altering the integer value used in the computation. This will, in turn, cause the integrity check to produce incorrect results, disrupting the program code's execution.

In some embodiments, the entanglement module 214 may modify a simple numeric constant by creating an expression that depends on the integer value. For instance, if the original constant is 1, the entanglement module 214 may create an expression such as: "threshold=0xABCE−readValue(target-instruction)." In this way, the threshold value depends on the integer value of the target instruction. In some implementations, the entanglement module 214 may entangle the integer value by replacing the constant with a complex computation, such as an expression-tree, which may involve multiple operations, such as addition, subtraction, modulo, or bitwise operations, etc. The entanglement module 214 may incorporate the integer value of a target instruction (retrieved dynamically through a function like readValue(target-instruction)) into an equation. The integer value serves as a critical value within the expression, making the result dependent on the integrity of the target instruction. The expanded expression ensures that the correct constant is only produced if the integer value of the target instruction remains unchanged. For example, if the original constant is 42, it may be replaced with a computation like (readValue(target-instruction)+offset)−adjustment, where the correct constant (42) is the result only when readValue (target-instruction) returns the intended byte-pattern/integer value.

In another example, the entanglement module 214 may modify a target address of a branch instruction based on the integer value: "branch_address=base_address+readValue(target-instruction)." In this example, the address for branching dynamically depends on the integer value of the target instruction. In this way, the entanglement module 214 may hide a constant's value within a computation such that the correct value is only produced if the byte-pattern of the target instruction remains unaltered. If the target instruction is tampered with, its byte-pattern will change, the corresponding integer value will change, and the computation will no longer produce the original constant, disrupting the program's functionality.

The generation module 216 generates the integrity checks and embeds the integrity checks at the respective locations in the program code. In some implementations, the generation module 216 may generate one integrity check for one or more target instructions. In some implementations, the generation module 216 may generate one or more integrity checks for the program code, and the one or more integrity checks may be embedded at one or more locations in the program code, e.g., each integrity check at a separate location, or one or more integrity checks sharing the same location, etc. The generation module 216 generates the integrity checks for the program code at the program code's build time. In cases where the integrity check is generated by entangling the byte-pattern of a target instruction into a computation of the program code, the integrity check may be directly inserted into the program code so that it executes as part of the normal control flow.

The program code with the generated integrity check may be transmitted to a client device 130 for deployment. During runtime of the program code, as the program code executes, the integrity checks embedded at the selected locations are triggered during runtime. The client device 130 retrieves the byte-pattern of the target instruction, reads it as an integer value, and performs a computation in the program code using the integer value. The computation involving the integer value is performed as part of the normal execution of the program code. In one implementation, the integrity of the target instruction has been maintained, the byte-pattern/integer value has not been altered, the computation of the verification will produce the expected result, and the program code will continue running correctly. In another implementation, the byte-pattern/integer value has been tampered with (e.g., an attacker modifies the instruction), the computation involving the altered byte-pattern will yield an incorrect result, leading to an interruption of the program code execution.

In one example, suppose the original constant is 42, the target byte-pattern is 0x1234, and the computation is constant=(readValue(target-instruction)+100)−4718. If the verification module 222 correctly retrieves 0x1234 (or 4660 as an integer value), and performs the calculation which produces 42, the program code may continue the execution, indicating the target instruction is not altered. However, if the verification module 222 retrieves a byte-pattern of "0xA1CD," the computation will yield a different result, breaking program functionality. This will indicate that the target instruction has been altered and fails the integrity check verification.

In some embodiments, the verification result may cause the client device 130 to perform a security action. The security actions may be, for example, halting execution, isolating the program code, and/or restricting functionality to prevent damage. In some implementations, security actions may include logging the incident, notifying the user, or escalating monitoring to respond effectively. For example, a notification of failed verifications may be displayed by the client device 130, e.g., the client device 130 may display one or more target instructions have been altered in a user interface of the client device 130. In some embodiments, the security service server may include a security function module 204 to access the client device 130 and monitor the verification of the integrity checks. The security function module 224 may provide recommended actions to the user responsive to receiving a failed verification result, such as triggering an error, halting execution, altering control flow, recording tampering attempts, or invoking other security measures. In some embodiments, the security function module 224 may keep a record of the verification results.

The data storage 206 may be configured to store example target instructions or types of instructions, and the example entanglement computations. The data storage 206 may collect, organize, and manage data for retrieval, updates, and analysis.

In some embodiments, the security service server 110 may provide an API 208, a software interface that provides functions and tools for users to generate integrity checks at build time of program code and/or deploy integrity checks at runtime of the program code. The API 208 may be used to identify target instructions for protection, determine locations for embedding the integrity checks, and/or entangle the byte-patterns of the target instructions into the computation of the program code.

Process for Implementing Lightweight Code Integrity

Figure 3:
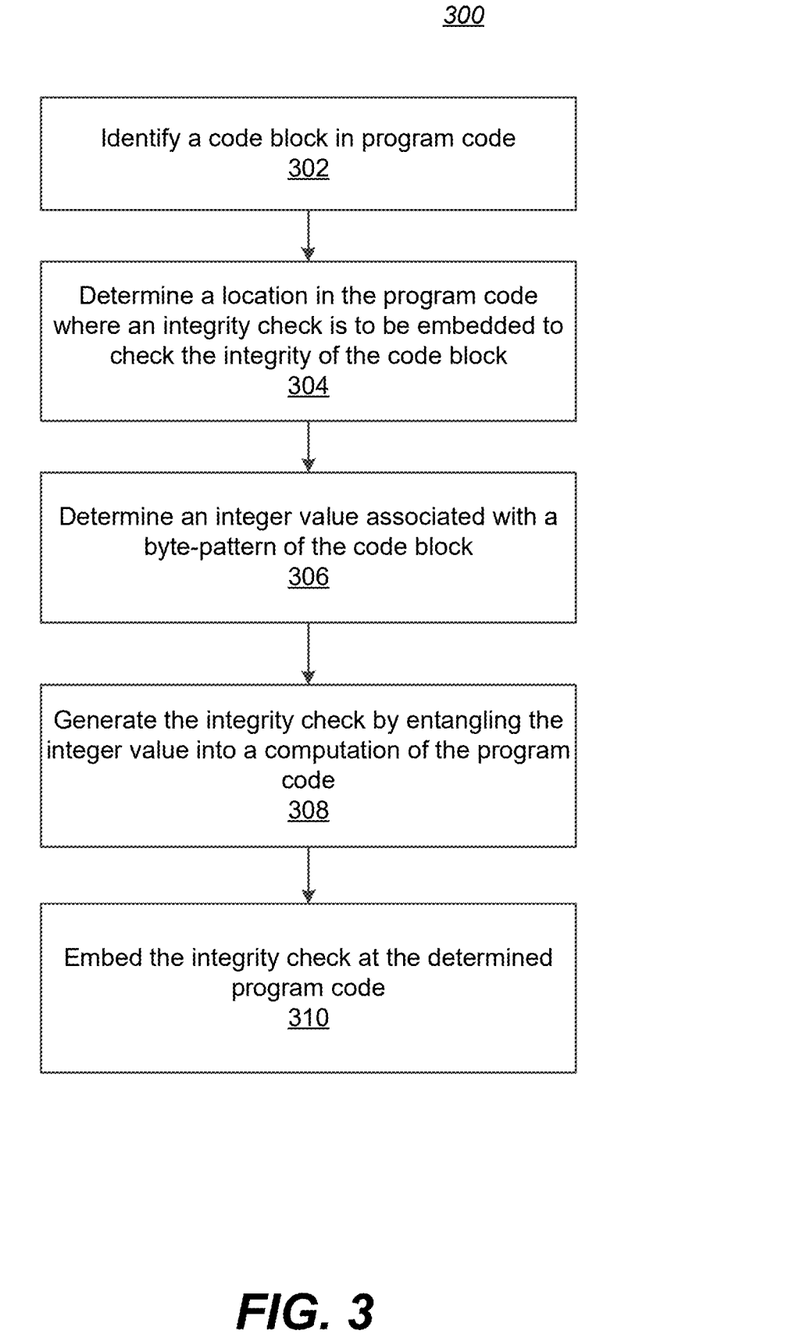
FIG. 3 illustrates one embodiment for generating integrity checks for program code at build time, according to one or more embodiments.

FIG. 3 illustrates one embodiment of a process 300 for generating integrity checks for program code at build time, according to one or more embodiments. In various embodiments, the process includes different or additional steps than those described in conjunction with FIG. 3. Further, in some embodiments, the steps of the process may be performed in different orders than the order described in conjunction with FIG. 3. The process described in conjunction with FIG. 3 may be carried out by the security service server 110 in various embodiments.

As shown in FIG. 3, the instruction processing module 212 in the security service server 110 identifies 302, a code block in program code. The code block may include one or more target instructions whose integrity are to be protected. In some embodiments, the target instructions may include branch instructions that control program flow (e.g., conditional jumps, calls, or returns), key constants or operations (such as cryptographic keys or security-critical algorithms), function entry points (such as for sensitive functions like authentication or privilege escalation handlers), and the like. The instruction processing module 212 determines 304 a location in the program code where an integrity check is to be embedded to check the integrity of the code block. The entanglement module 214 in the security service server 110 determines 306, an integer value associated with a byte-pattern of the code block and generates 308, the integrity check by entangling the integer value into a computation of the program code. In one example, entangling the integer value may include modifying a numeric constant by generating an expression that depends on the integer value to compute the numeric constant. In another example, the entanglement module 214 may entangle the integer value by modifying a target address of the branch instruction to be a value computed in part with the integer value. In still another example, the entanglement module 214 may entangle the integer value by integrating the integer value into the program code so that computing a correct value of the integer value during runtime of the program code affects an execution of the program code. The generation module 216 in the security service server 110 embeds 310 the integrity check at the determined location in the program code. The generation module 216 may generate the integrity check and embed the integrity check in the program code during build time of the program code and verify the integrity check during runtime of the program code. In some implementations, the verification module 222 in the security service server 110 may verify the integrity check by executing the program code at the selected location. Responsive to determining that the execution of the program code is interrupted, the security function module 224 may determine that the integrity of the program code is corrupted. Alternatively, the program code is executed successfully, and the security function module 224 determines that the integrity of the program code is not corrupted.

Figure 4:
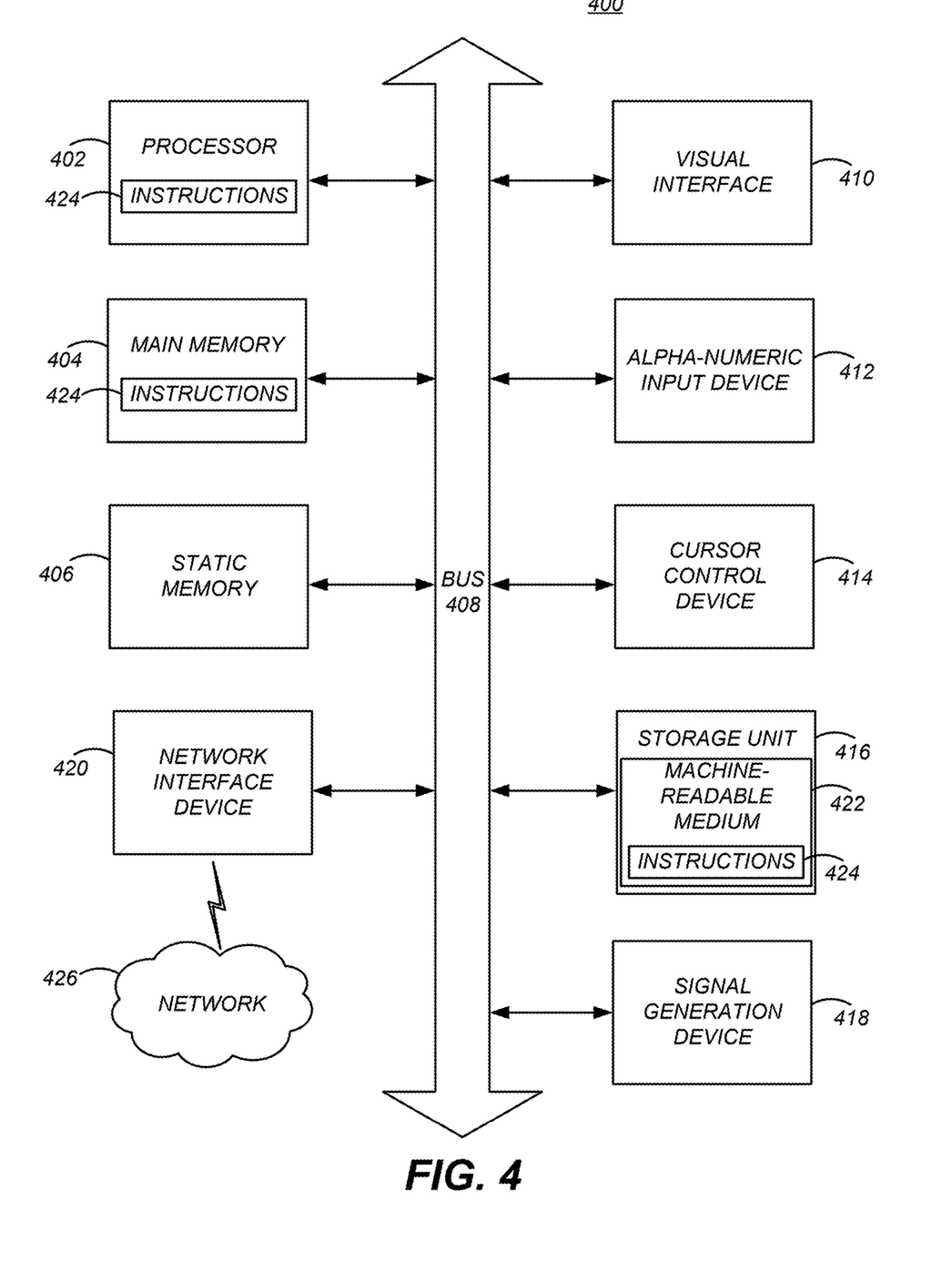
FIG. 4 is a block diagram illustrating components of an example machine that can read instructions from a machine-readable medium and execute them in a processor (or controller), according to one or more embodiments.

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400 within which program code (e.g., software) for causing the machine to perform any one or more of the methodologies discussed herein may be executed. The program code may be comprised of instructions 424 executable by one or more processors 402. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a tablet, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include visual display interface 410. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 410 may include or may interface with a touch enabled screen. The computer system 400 may also include alphanumeric input device 412 (e.g., a keyboard or touch screen keyboard), a cursor control device 414 (e.g., a mouse, a trackball, a joystick, a motion sensor, or other pointing instrument), a storage unit 416, a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but is not limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   receiving, by a server, during build time, a software package comprising program code;
   identifying, by the server, during the build time, a code block in the program code, the code block comprising one or more target instructions for protection;
   determining, by the server, during the build time, a location in the program code where an integrity check is to be embedded to check the integrity of the code block;
   determining, by the server, during the build time, an integer value associated with a byte-pattern in the code block;
   generating, by the server, during the build time, the integrity check by entangling the integer value into a computation of the program code; and
   embedding, by the server, during the build time, the integrity check at the determined location in the program code,
   monitoring, by a security module, at run time, an outcome of the integrity check based on execution of the program code, wherein responsive to the outcome being indicative of a failure, a security action is performed.

2. The method of claim 1, wherein entangling the integer value comprises:
   modifying a numeric constant by generating an expression that depends on the integer value to compute the numeric constant.

3. The method of claim 1, wherein the code block includes a branch instruction, and wherein entangling the integer value comprises:
   modifying a target address of the branch instruction to be a value computed in part with the integer value.

4. The method of claim 1, wherein entangling the integer value comprises:
   integrating the integer value into the program code so that computing a correct value of the integer value during runtime of the program code affects an execution of the program code.

5. The method of claim 1, further comprising:
running, during runtime of the program code, the integrity check by executing the program code at the determined location;
responsive to determining that the program code is executed successfully, determining that the integrity of the program code is not corrupted.

6. The method of claim 1, further comprising:
running the integrity check by executing the program code at the determined location;
responsive to determining that the execution of the program code is interrupted, determining that the integrity of the program code is corrupted.

7. The method of claim 1, wherein identifying the code block comprises:
selecting an instruction in the program code as a target instruction, the selected instruction comprising one or more of a branch instruction, an instruction associated with a constant for execution of the program code, an instruction with a condition jump, or an instruction with an entry point of a security sensitive function.

8. The method of claim 1, wherein the integrity check is generated and embedded in the program code during build time of the program code, and is executed during runtime of the program code.

9. A non-transitory computer readable medium configured to store instructions, the instructions when executed by one or more processors causing the one or more processors to perform operations comprising:
receiving, by a server, during build time, a software package comprising program code;
identifying, by the server, during the build time, a code block in the program code, the code block comprising one or more target instructions for protection;
determining, by the server, during the build time, a location in the program code where an integrity check is to be embedded to check the integrity of the code block;
determining, by the server, during the build time, an integer value associated with a byte-pattern in the code block;
generating, by the server, during the build time, the integrity check by entangling the integer value into a computation of the program code; and
embedding, by the server, during the build time, the integrity check at the determined location in the program code,
monitoring, by a security module, at run time, an outcome of the integrity check based on execution of the program code, wherein responsive to the outcome being indicative of a failure, a security action is performed.

10. The non-transitory computer readable medium of claim 9, wherein entangling the integer value comprises:
modifying a numeric constant by generating an expression that depends on the integer value to compute the numeric constant.

11. The non-transitory computer readable medium of claim 9, wherein the code block includes a branch instruction, and wherein entangling the integer value comprises:
modifying a target address of the branch instruction to be a value computed in part with the integer value.

12. The non-transitory computer readable medium of claim 9, wherein entangling the integer value comprises:
integrating the integer value into the program code so that computing a correct value of the integer value during runtime of the program code affects an execution of the program code.

13. The non-transitory computer readable medium of claim 9, the operations further comprising:
running, during runtime of the program code, the integrity check by executing the program code at the determined location;
responsive to determining that the program code is executed successfully, determining that the integrity of the program code is not corrupted.

14. The non-transitory computer readable medium of claim 9, the operations further comprising:
running the integrity check by executing the program code at the determined location;
responsive to determining that the execution of the program code is interrupted, determining that the integrity of the program code is corrupted.

15. The non-transitory computer readable medium of claim 9, wherein identifying the code block comprises:
selecting an instruction in the program code as a target instruction, the selected instruction comprising one or more of a branch instruction, an instruction associated with a constant for execution of the program code, an instruction with a condition jump, or an instruction with an entry point of a security sensitive function.

16. The non-transitory computer readable medium of claim 9, wherein the integrity check is generated and embedded in the program code during build time of the program code, and is executed during runtime of the program code.

17. A system comprising memory with instructions encoded thereon that, when executed by one or more processors, cause the one or more processors to perform operations comprising:
receiving, by a server, during build time, a software package comprising program code;
identifying, by the server, during the build time, a code block in the program code, the code block comprising one or more target instructions for protection;
determining, by the server, during the build time, a location in the program code where an integrity check is to be embedded to check the integrity of the code block;
determining, by the server, during the build time, an integer value associated with a byte-pattern in the code block;
generating, by the server, during the build time, the integrity check by entangling the integer value into a computation of the program code; and
embedding, by the server, during the build time, the integrity check at the determined location in the program code,
monitoring, by a security module, at run time, an outcome of the integrity check based on execution of the program code, wherein responsive to the outcome being indicative of a failure, a security action is performed.

18. The system of claim 17, wherein entangling the integer value comprises:
integrating the integer value into the program code so that computing a correct value of the integer value during runtime of the program code affects an execution of the program code.

19. The system of claim 17, wherein the integrity check is generated and embedded in the program code during build time of the program code, and is executed during runtime of the program code.

20. The system of claim 17, wherein identifying the code block comprises:
selecting an instruction in the program code as a target instruction, the selected instruction comprising one or more of a branch instruction, an instruction associated with a constant for execution of the program code, an instruction with a condition jump, or an instruction with an entry point of a security sensitive function.

* * * * *